(12) United States Patent
Pascoguin et al.

(10) Patent No.: US 10,490,965 B1
(45) Date of Patent: Nov. 26, 2019

(54) SPATIAL PHASE MASK DESIGN FOR REMOTE LASER PLASMA FILAMENT CONFINEMENT LIFETIME CONTROL

(71) Applicant: United States of America as represented by the Secretary of the Navy, San Diego, CA (US)

(72) Inventors: Bienvenido Melvin L. Pascoguin, San Diego, CA (US); Brittany Lynn, San Diego, CA (US); Alexandru Hening, San Diego, CA (US); Ryan Lu, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/289,362

(22) Filed: Feb. 28, 2019

(51) Int. Cl.
| | | |
|---|---|---|
| *H01S 3/00* | (2006.01) | |
| *G02F 1/13* | (2006.01) | |
| *G02B 27/09* | (2006.01) | |
| *G03H 1/04* | (2006.01) | |

(52) U.S. Cl.
CPC ........ *H01S 3/0071* (2013.01); *G02B 27/0955* (2013.01); *G02F 1/1306* (2013.01); *G03H 1/0443* (2013.01); *H01S 3/0085* (2013.01); *G03H 2001/0458* (2013.01)

(58) Field of Classification Search
None
See application file for complete search history.

(56) References Cited

PUBLICATIONS

Jingzhao Zhang, Nicolas Pégard, Jingshan Zhong, Hillel Adesnik, and Laura Waller, "3D computer-generated holography by non-convex optimization," Optica 4, 1306-1313 (2017).
Jeffrey A. Davis, B. Melvin L. Pascoguin, C. Stewart Tuvey, and Don M. Cottrell, "Fourier transform pupil functions for modifying the depth of focus of optical imaging systems," Appl. Opt. 48, 4893-4898 (2009).

*Primary Examiner* — Chad H Smith
(74) *Attorney, Agent, or Firm* — Naval Information Warfare Center, Pacfic; Kyle Eppele; J. Eric Anderson

(57) ABSTRACT

A method for spatial and intensity control of remote foci locations of an optical beam generated from a light source. First and second, axially-aligned, non-diffractive foci are created by passing the optical beam through a phase mask and a Fourier lens. The phase mask q(s) is designed to have an axial response according to the following equation:

$$E(u) = \int_{-\infty}^{+\infty} q(s) \exp(-2\pi u_0 s) \exp(2\pi u s) ds.$$

The properties of the phase mask may be altered to independently vary location and intensity of the first and second foci.

12 Claims, 7 Drawing Sheets

*10*

- Generate the optical beam from a light source. — *10a*
- Create first and second, axially-aligned, non-diffractive foci by passing the optical beam through a phase mask and a Fourier lens. — *10b*
- Alter properties of the phase mask to independently vary location and intensity of the first and second foci. — *10c*

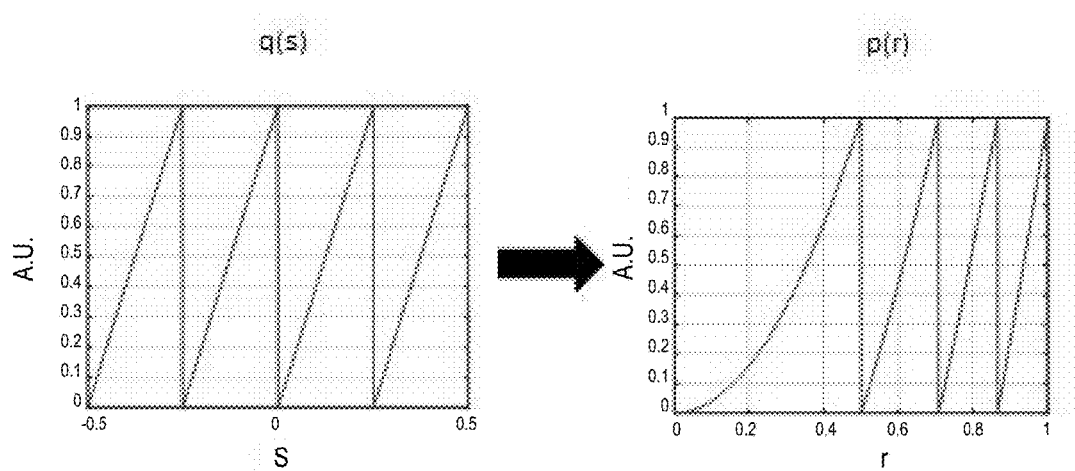
Fig. 4A  Fig. 4B
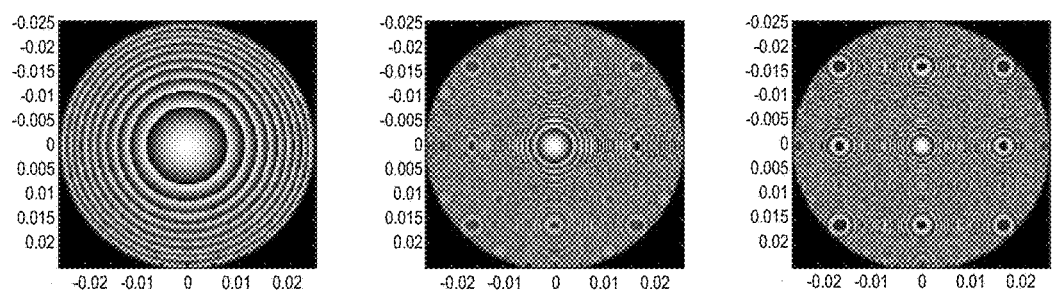
Fig. 4C  Fig. 4D  Fig. 4E

SPATIAL PHASE MASK DESIGN FOR REMOTE LASER PLASMA FILAMENT CONFINEMENT LIFETIME CONTROL

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 108598.

BACKGROUND OF THE INVENTION

In the past, laser plasma filaments were generated due to the Kerr effect creating multiple axial foci along the propagation path of a high intensity laser beam. The high intensity beam breaks down the atmosphere and generates plasma at each focus point. This process is repeated over and over, causing the beam to focus, de-focus and focus again, generating a plasma filament. A disadvantage of this method is that the only parameter that is used to control the behavior (length, position, lifetime) of the plasma filament is the peak power, pulse length and geometrical focus of the laser.

Prior works have been done to attempt to overcome some deficiencies through the use of a method called "sub-aperturing" to create the location and intensity control where they divide the whole optical aperture radially (into rings of different radius) or rotationally (into triangle-like slices). Each focal location/intensity difference is imparted with these different slices of the optical aperture. The issue with this implementation is that this sub-aperturing causes the effective optical aperture of the propagating wavefront to be reduced, limiting the ability to propagate these types of beams over large distances and placing a lower limit on the spot size that can be achieved at focus. There are iterative holographic techniques that have been used to generate axial foci, but computer generated masks are (1) designed in a brute force manner and without the relationships between the physical effect and the necessary wavefront alterations, (2) there is no way to tune the system to account for any operating condition issues that may need adjustment to the mask. Other works have achieved similar results using intensity masks but these systems have a large amount of optical loss due to the absorptive manner in which the mask works. This is especially unsuitable for high power systems where absorption will cause the device to break. There is a need for an improved method of creating a plasma filament.

SUMMARY

Disclosed herein is a method for spatial and intensity control of remote foci locations of an optical beam comprising the following steps. The first step provides for generating the optical beam from a light source. The next step provides for creating first and second, axially-aligned, non-diffractive foci by passing the optical beam through a phase mask and a Fourier lens. The phase mask $q(s)$ is designed to have an axial response according to the following equation:

$$E(u) = \int_{-\infty}^{+\infty} q(s)\exp(-2\pi u_0 s)\exp(2\pi us)ds$$

where $E(u)$ is a Fourier transform relation of the axial response of the phase mask $q(s)$, $u$ is a dimensionless variable defined as $$\frac{a^2}{2\lambda z},$$

$a$ is a radius of the phase mask, $\lambda$ is a wavelength of the optical beam, $z$ is an optical axis, $u_0$ is a dimensionless variable defined as $$\frac{a^2}{2\lambda f},$$

$f$ is a first focal length of the Fourier lens, $s$ is a dimensionless variable defined as $$\left(\frac{r}{a}\right)^2 - .5,$$

and $r$ is a radial coordinate of a resulting pattern. The properties of the phase mask may be altered to independently vary location and intensity of the first and second foci.

BRIEF DESCRIPTION OF THE DRAWINGS

Throughout the several views, like elements are referenced using like references. The elements in the figures are not drawn to scale and some dimensions are exaggerated for clarity.

FIG. 4A is an illustration of a blazed phase grating in s-space.
FIG. 4B is an illustration of a blazed phase grating in real space.
FIGS. 4C, 4D, and 4E show resulting patterns for different annular phase masks.

DETAILED DESCRIPTION OF EMBODIMENTS

The disclosed method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
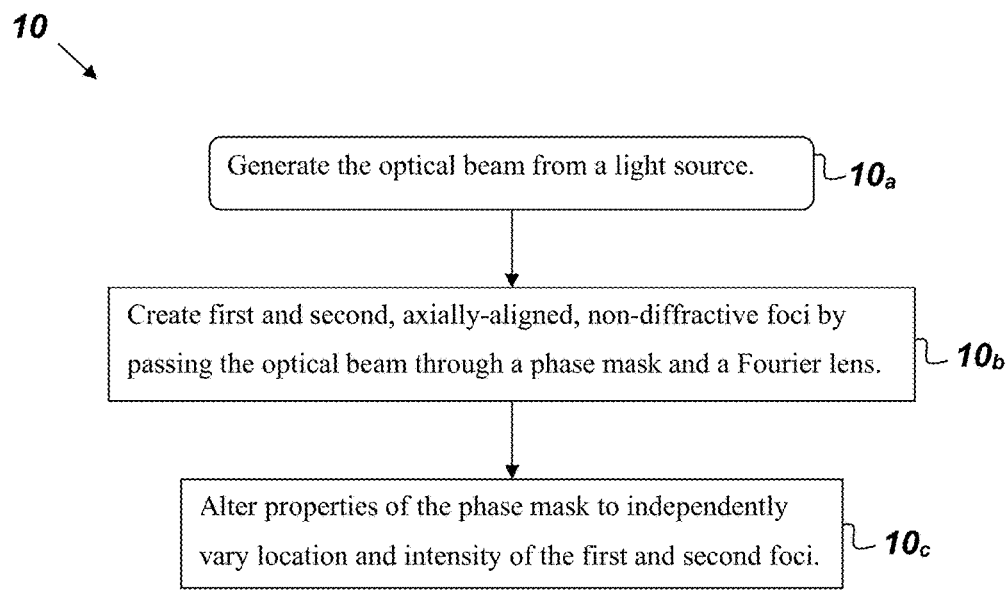
FIG. 1A is a flowchart of a method for foci control.

FIG. 1A is a flowchart of a method 10 for spatial and intensity control of remote foci locations of an optical beam. Method 10 comprises, consists of, or consists essentially of the following steps. The first step $10_a$ provides for generating the optical beam from a light source. The next step $10_b$ provides for creating first and second, axially-aligned, non-diffractive foci by passing the optical beam through a phase mask and a Fourier lens. The next step $10_c$ provides for altering the properties of the phase mask to independently vary location and intensity of the first and second foci.

Figure 1B:
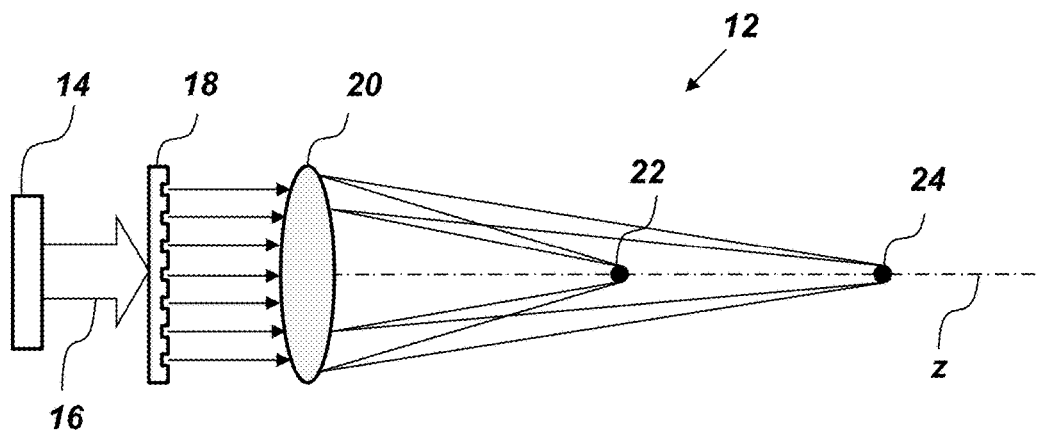
FIG. 1B is an illustration of an optical system.

FIG. 1B is an illustration of an optical system 12 that may be used in conjunction with method 10. Optical system 10 comprises a light source 14 that generates an optical beam 16. The optical beam 16 passes through a phase mask 18 and a Fourier lens 20 to create a first focus 22 and a second focus 24, both of which are axially-aligned along an axis z. The phase mask 18 may be controlled to axially divide and control the location of the foci spots 22 and 24 and modulate individual focus intensity of the optical beam 16 from the light source 14, which may be any light source capable of producing an optical beam with sufficient coherence length to create the first and second foci 22 and 24. The phase mask used in accordance with method 10 is designed to produce non-diffractive foci, this means that as one traces the light beam (such as the optical beam 16 shown in FIG. 1B), if the first focus 22 is blocked by any object, the light is distributed in a manner such that the second focus 24 will still be focused. This non diffractive foci distribution has many applications ranging from laser plasma filament lifetime control, optical tweezing, and simultaneous 3-d memory printing.

Figure 2A:
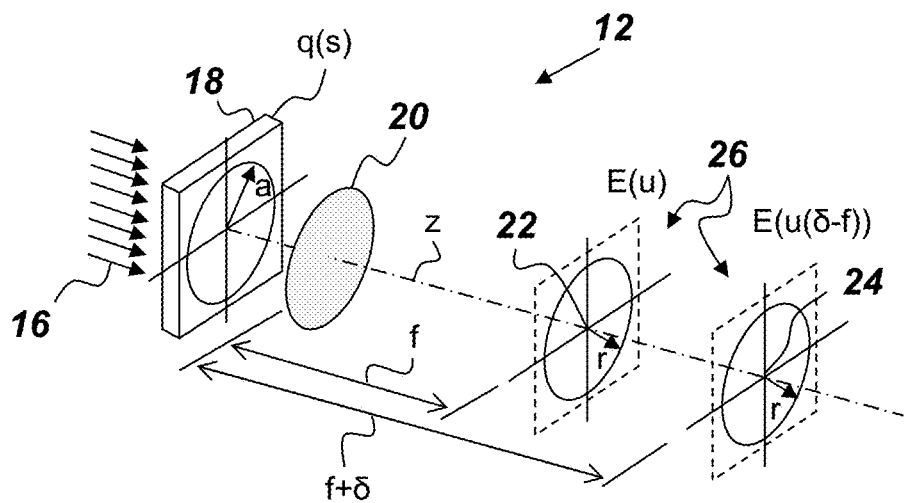
FIG. 2A is a perspective-view illustration of an optical system.

FIG. 2A is a perspective-view illustration of the optical system 12. The phase mask q(s) is designed to have an axial response according to the following equation:

$$E(u) = \int_{-\infty}^{+\infty} q(s)\exp(-2\pi u_0 s)\exp(2\pi u s) ds \qquad \text{(Eq. 1)}$$

where E(u) is a Fourier transform relation of the axial response of the phase mask q(s), u is a dimensionless variable defined as $$\frac{a^2}{2\lambda z},$$

a is a radius of the phase mask, λ is a wavelength of the optical beam 16, z is an optical axis, $u_0$ is a dimensionless variable define as $$\frac{a^2}{2\lambda f},$$

f is a first focal length of the Fourier lens 20, s is a dimensionless variable defined as $$\left(\frac{r}{a}\right)^2 - .5,$$

and r is a radial coordinate of a resulting pattern 26.

If we consider an axially symmetric phase mask and analyze the origin at x=0, y=0, then the axial response Fresnel diffraction formula can be simplified as shown below.

$$E(x=0, y=0, z) = \frac{i}{\lambda z}\int_0^a p(r)\exp\left(-\frac{ikr^2}{2f}\right)\exp\left(\frac{ikr^2}{2z}\right)2\pi r dr \qquad \text{(Eq. 2)}$$

In equation 2 above, $$k = \frac{2\pi}{\lambda}.$$

If we define the dimensionless variables u, $u_0$, and s with values ranging from −0.5 to +0.5, Equation 2 may be rewritten into Equation 1 above, which shows a Fourier transform relation of the axial response and the phase mask.

Figure 2B:
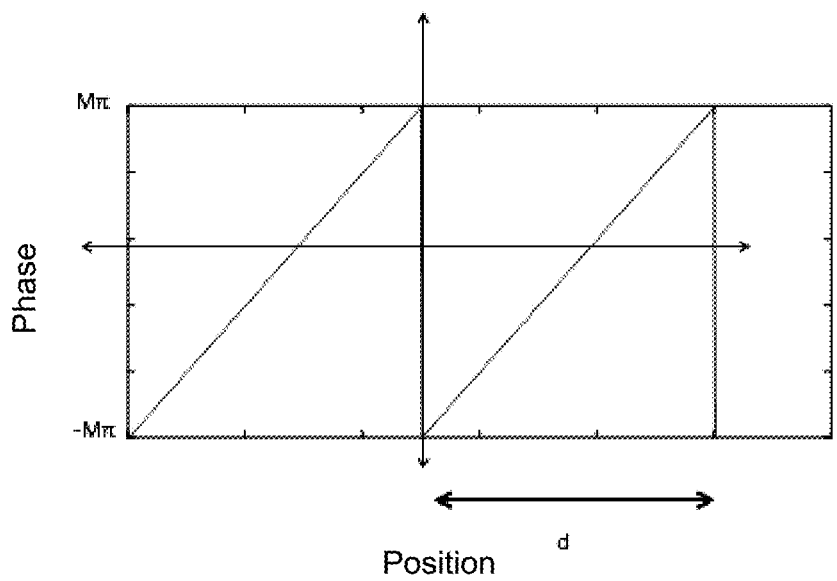
FIG. 2B is a plot of phase and position for a phase mask.

FIG. 2B is a plot showing the relationship between phase and position that is representative of a design for a phase mask q(s), with which we can generate the first and second foci 22 and 24 respectively at E(u) and E(u(δ−f)), such as are depicted in FIG. 2A.

$$\gamma = \frac{2\pi}{d} \qquad \text{(Eq. 3)}$$

$$t(x) = \exp(iM\gamma x) \qquad \text{(Eq. 4)}$$

$$t(x) = \sum c_n \exp(in\gamma x) \qquad \text{(Eq. 5)}$$

$$c_n = \left(\frac{1}{d}\right)\int_0^d t(x)\exp(-in\gamma x)dx \qquad \text{(Eq. 6)}$$

$$c_n = \frac{\sin((M-n)\pi)}{(M-n)\pi} \qquad \text{(Eq. 7)}$$

Where γ is a wavenumber, d is period of the phase mask 18, t(x) is a transmission function, M is the modulation depth or level of phase difference, x is the position, $c_n$ is the Fourier series constant expansion, and n is the order of the Fourier series.

Figure 3A:
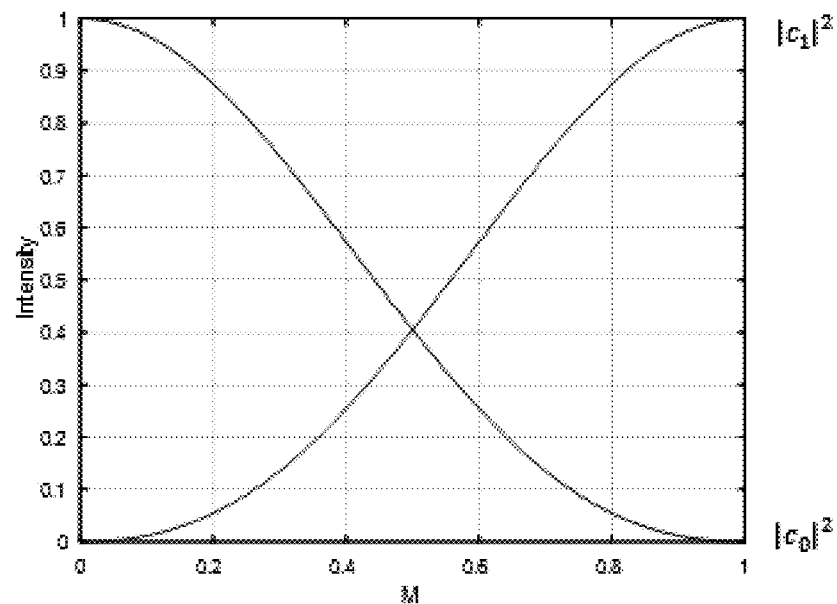
FIG. 3A is a plot showing shifting orders of intensity.
Figure 3B:
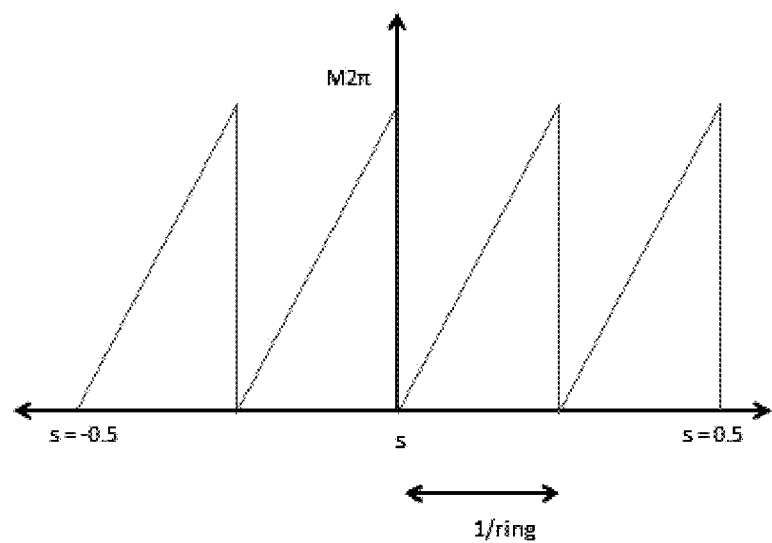
FIG. 3B is an illustration of a phase blazed grating design.

FIG. 3A is a plot showing the order of intensity shifting from the first order to zero order. FIG. 3B is an illustration of a phase blazed grating design for an embodiment of the phase mask 18. If one considers a phase blazed function p(s) such as is shown in FIG. 3B where 1/ring is the period, then one can design a phase mask with an axial response where most of the optical energy can be varied from one focus to the other.

FIG. 4A is an illustration of a blazed phase grating in s-space. S-space is not a physical space but it is a space in which we have a Fourier transform relation between the phase mask 18 and the depth of focus. FIG. 4B is a plot representing the translation of the blazed phase grating in s-space depicted in FIG. 4A to the real space r, where r is the radius of the phase mask 18 and where s=(r/a)²−0.5 and r=a√(s+0.5). FIGS. 4C, 4D, and 4E show different resulting patterns 26 for different annular embodiments of the phase mask 18 where M is equal to 2π, f=50e−2 meters, λ=800× $10^{-9}$ meters, and a=2.5e−2 meters. FIG. 4C represents the resulting pattern 26 of an annular embodiment of the phase mask 18 having 10 rings. FIG. 4D represents the resulting pattern 26 of an annular embodiment of the phase mask 18 having 50 rings. FIG. 4E represents the resulting pattern 26 of an annular embodiment of the phase mask 18 having 100 rings. The Fourier transform of a periodic function, T, will have a period 1/T. The function q(s) has a period of $$s_{period} = \frac{1}{N_{ring}},$$

therefore Q(u) will have a period $u_{period}=N_{ring}$. This relation may be used to calculate the location of the second focus 24 using the defined variables s, u and δ.

$$(\delta - f) = \left(\frac{a^2}{a^2 + N_{ring}f\lambda} - 1\right)f \quad \text{(Eq. 7)}$$

TABLE 1

| $N_{ring}$ | (δ – f) [millimeters] |
|---|---|
| 10 | −3.1797 |
| 50 | −15.5039 |
| 100 | −30.0752 |

Figure 5A:
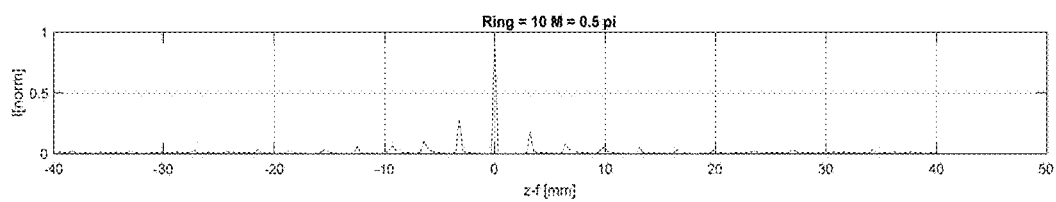
FIGS. 5A, 5B, 5C, 6A, 6B, 6C, 7A, 7B, and 7C are plots of the focal length of a second focus for several different embodiments of a phase mask having different number of rings.
Figure 5B:
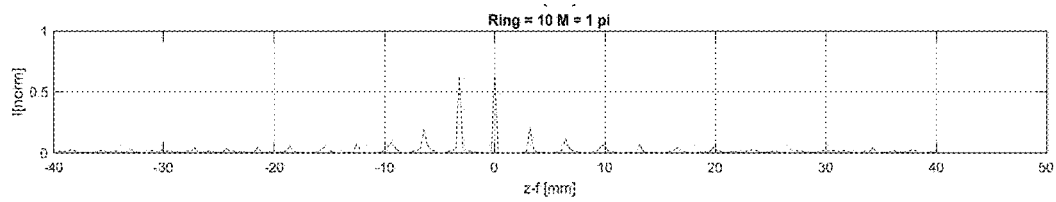
Figure 5C:
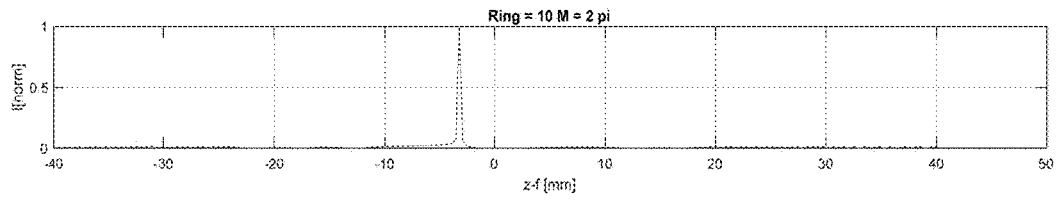

FIGS. 5A, 5B, and 5C are plots of the focal length of the second focus 24, or δ-f, of several different embodiments of the phase mask 18 having 10 rings. FIG. 5A represents δ-f for an embodiment of the phase mask 18 where M=0.5π. FIG. 5B represents δ-f for an embodiment of the phase mask 18 where M=π. FIG. 5C represents δ-f for an embodiment of the phase mask 18 where M=2π.

Figure 6A:
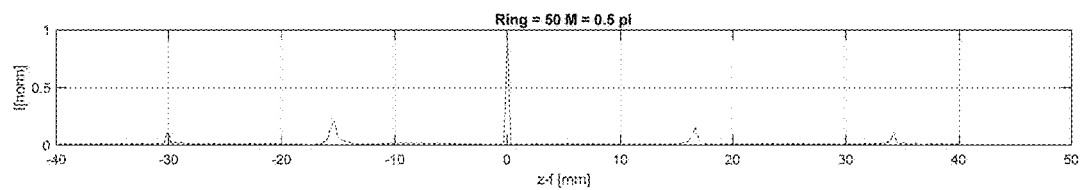
Figure 6B:
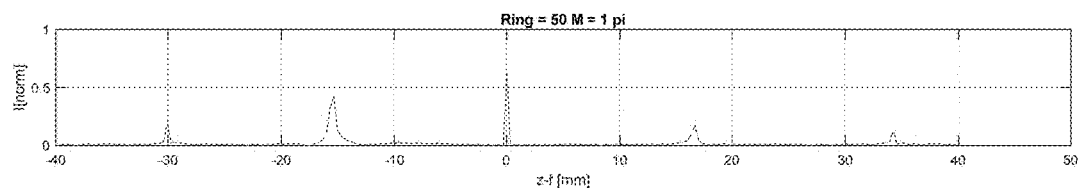
Figure 6C:
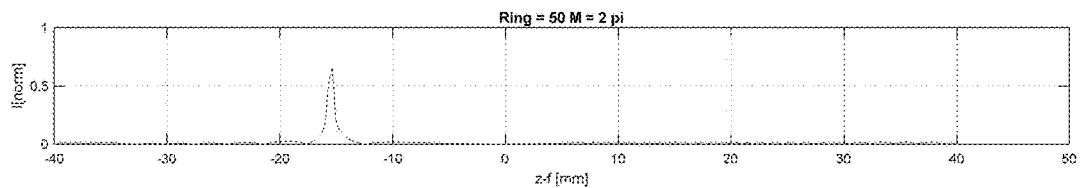

FIGS. 6A, 6B, and 6C are plots of the focal length of the second focus 24, or δ-f, of several different embodiments of the phase mask 18 having 50 rings. FIG. 6A represents δ-f for an embodiment of the phase mask 18 where M=0.5π. FIG. 6B represents δ-f for an embodiment of the phase mask 18 where M=π. FIG. 6C represents δ-f for an embodiment of the phase mask 18 where M=2π.

Figure 7A:
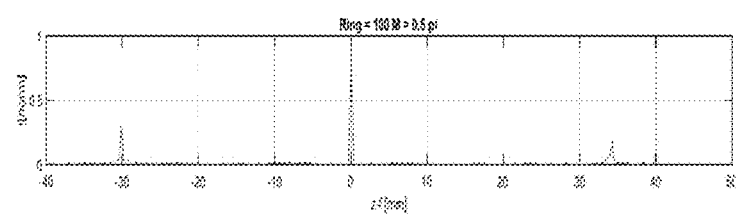
Figure 7D:
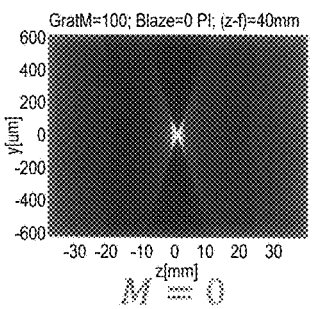
FIGS. 7D, 7E, and 7F are intensity plots showing the intensity of multiple foci.
Figure 7B:
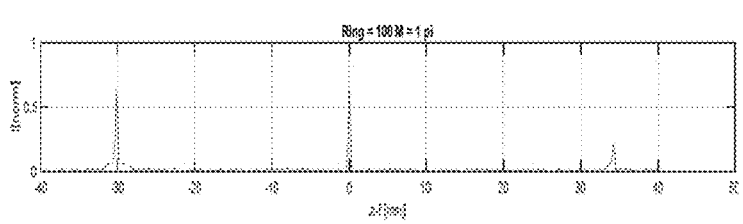
Figure 7E:
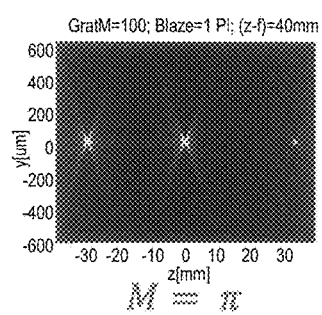
Figure 7C:
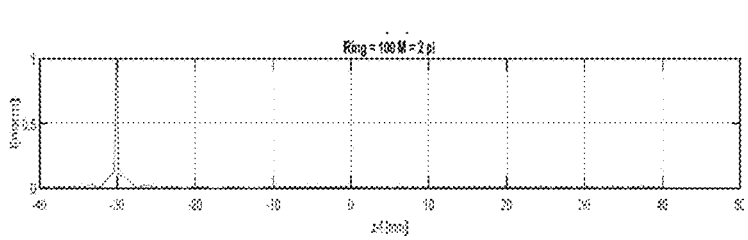
Figure 7F:
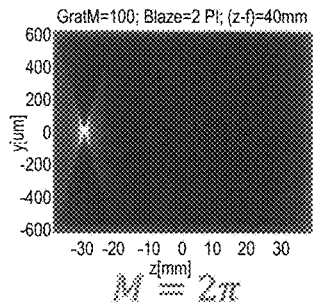

FIGS. 7A, 7B, and 7C are plots of the focal length of the second focus 24, or δ-f, of several different embodiments of the phase mask 18 having 100 rings. FIG. 7A represents δ-f for an embodiment of the phase mask 18 where M=0.5π. FIG. 7B represents δ-f for an embodiment of the phase mask 18 where M=π. FIG. 7C represents δ-f for an embodiment of the phase mask 18 where M=2π. FIGS. 7D, 7E, and 7F are plots showing the intensity of the first and second foci 22 and 24.

Method 10 is a novel way to spatially control remote foci location and modulate foci intensity independently. Method 10 is superior to using absorption-based masks to control foci intensity and location. Method 10's use of phase masks, as described herein, results in the propagating optical beam 16 being distributed across the entire lens 20. This enables the optical system 12 to perform even if the aperture, or lens 20, is partially occluded or altered, which tends to be a standard occurrence in an outdoor engineering system. Method 10 also enables multiple foci to be propagated long distances while still having a focal region defined by the entire aperture size. Again, this is important in any distance propagation application such as free-space communications, directed energy applications, or anywhere that needs optical propagation more than a few feet. Additionally, this is useful in plasma filament generation specifically because while the first focal location can start the plasma filament, the power for the next one is reserved outside the first focus so that the filament doesn't block the energy needed to extend the length. This is one of the current issues limiting the length of plasma filaments.

Method 10 may be used for any operational environment in which the control of focal separation and relative intensity is needed. Additionally, higher order mode structures can be simply summed with the calculated phase mask, enabling other types of beam structures such as vortex beams, orbital angular momentum, etc. Method 10 provides independent spatial and intensity control of remote, simultaneous, multiple foci locations of an optical beam as well as independent control of the orbital angular momentum (OAM) state of the optical beam 16 through three variables: the number of Fresnel rings present in the "lens", the phase range across the grooves of the phase mask 18, and the OAM radial state.

From the above description of method 10, it is manifest that various techniques may be used for implementing the concepts of method 10 without departing from the scope of the claims. The described embodiments are to be considered in all respects as illustrative and not restrictive. The method/system disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for spatial and intensity control of remote foci locations of an optical beam comprising the following steps:

generating the optical beam from a light source;

creating first and second, axially-aligned, non-diffractive foci by passing the optical beam through a phase mask and a Fourier lens, wherein the phase mask q(s) is designed to have an axial response according to the following equation:

$$E(u) = \int_{-\infty}^{+\infty} q(s)\exp(-2\pi u_0 s)\exp(2\pi u s)ds$$

where E(u) is a Fourier transform relation of the axial response of the phase mask q(s), u is a dimensionless variable defined as $$\frac{a^2}{2\lambda z},$$

a is a radius of the phase mask, λ is a wavelength of the optical beam, z is an optical axis, $u_0$ is a dimensionless variable defined as $$\frac{a^2}{2\lambda f},$$

f is a first focal length of the Fourier lens, s is a dimensionless variable defined as $$\left(\frac{r}{a}\right)^2 - .5,$$

and r is a radial coordinate of a resulting pattern; and
  altering properties of the phase mask to independently vary location and intensity of the first and second foci.

2. The method of claim 1, wherein the phase mask is a transformed blazed grating in s-space.

3. The method of claim 1, wherein the phase mask is a liquid crystal display (LCD).

4. The method of claim 2, wherein the phase mask is in a surface relief solid media.

5. The method of claim 2, wherein the phase mask is formed of holographic media.

6. The method of claim 1, wherein the altering step is performed in real time in response to changes in operating conditions.

7. The method of claim 1, further comprising the step of summing higher order mode structures with a calculated phase mask to enable a vortex beam structure.

8. The method of claim 1, further comprising the step of summing higher order mode structures with a calculated phase mask to enable an orbital angular momentum beam structure.

9. The method of claim 1, further comprising a step of generating a plasma filament based on the first and second foci.

10. The method of claim 9, further comprising a step of controlling a length of the plasma filament by altering the properties of the phase mask to independently vary location and intensity of the first and second foci.

11. The method of claim 1, further comprising a step of independently controlling focal shift, relative focus intensity and orbital angular momentum (OAM) state of the first and second foci by altering one or more of: a number of Fresnel rings present in the Fourier lens, a phase range across grooves of the phase mask, and an OAM radial state.

12. A method for spatial and intensity control of remote foci locations of an optical beam comprising the following steps:
  generating the optical beam from a light source; and
  creating first and second, axially-aligned, non-diffractive foci by passing the optical beam through a phase mask and a Fourier lens, wherein the phase mask q(s) is designed to have an axial response according to the following equation:

$$E(u) = \int_{-\infty}^{+\infty} q(s)\exp(-2\pi u_0 s)\exp(2\pi u s)ds$$

where E(u) is a Fourier transform relation of the axial response of the phase mask q(s), u is a dimensionless variable defined as $$\frac{a^2}{2\lambda z},$$

a is a radius of the phase mask, $\lambda$ is a wavelength of the optical beam, z is an optical axis, $u_0$ is a dimensionless variable defined as $$\frac{a^2}{2\lambda f},$$

f is a first focal length of the Fourier lens, s is a dimensionless variable defined as $$\left(\frac{r}{a}\right)^2 - .5,$$

and r is a radial coordinate of a resulting pattern.

* * * * *